United States Patent [19]

Trägårdh

[11] 4,224,168
[45] Sep. 23, 1980

[54] HOLDER FOR FILTER BAGS

[75] Inventor: Jan Trägårdh, Copenhagen, Denmark

[73] Assignee: Teafilter International A/PS, Copenhagen, Denmark

[21] Appl. No.: 962,091

[22] Filed: Nov. 20, 1978

[51] Int. Cl.² .......................................... B01D 23/00
[52] U.S. Cl. .................................. 210/470; 99/295; 210/474
[58] Field of Search ............... 210/470, 483, 541, 542, 210/474; 99/295, 306, 323

[56] References Cited

U.S. PATENT DOCUMENTS

| | | | |
|---|---|---|---|
| 3,483,812 | 12/1969 | Gast et al. | 99/295 |
| 3,615,708 | 10/1971 | Abile-Gal | 99/295 X |

Primary Examiner—William A. Cuchlinski, Jr.
Attorney, Agent, or Firm—Becker & Becker, Inc.

[57] ABSTRACT

A holder of elastic material for filter bags open at the top for preparing beverages, especially tea and coffee, which comprises a tubular stud having two oppositely arranged stud sections connected at their upper ends by an annular member and spaced from each other by a slot having two diametrically arranged slot sections while at least one manually operable spring-urged pressure member is provided which is adapted to press the stud sections toward each other to reduce the diameter of the stud and thereby facilitate the placing of a filter bag on the stud. Advantageously the stud sections are provided with tapering surfaces to facilitate the slipping of a filter bag onto the stud, while barbs or the like are provided on the stud sections for piercing an inserted filter bag and holding the same.

8 Claims, 4 Drawing Figures

HOLDER FOR FILTER BAGS

The present invention relates to a holder of elastic material, especially synthetic material, for holding a filter bag for preparing beverages, such as tea and coffee, while the filter bag with the tea leaves or the ground coffee immerses into the hot water in the beverage container or hot water is poured into or through the filter bag.

A heretofore known holder of the above mentioned general type has a tubular stud which tapers at its lower end for holding a filter bag, and is provided with a slot or the like extending in axial direction of the stud for furnishing the possibility of decreasing the circumference of the stud against a spring force. Furthermore, this known holder has the upper end of the stud provided with extensions for placing the holder onto the rim of the beverage container. For limiting the placement of a filter bag upon the upper end of the stud there is provided an annular broadened section. Furthermore, this holder has a handle by means of which it can be handled and carried and also has a so-called pressing cam by means of which the stud can be reduced in circumference or can be compressed to a certain extent for facilitating the introduction of the stud into a filter bag or placing the filter bag onto the stud.

A drawback of this known holder described in German Gebrauchsmuster No. 77 18 546 is that the compressed or circumferentially reduced stud of the holder can be introduced only with difficulty into the opening of a filter bag known as a flat bag. For properly introducing and connecting a filter bag into and onto such a holder, a certain skill is required.

Similarly, also German Offenlegungsschrift No. 20 17 606 discloses a one-piece holder for holding a filter bag for tea or coffee, which holder has a stud tapering toward its lower end. Also in this instance the holder is slotted in axial direction while the stud can likewise be reduced in its circumference against a spring force or can be compressed. Also this known holder has the drawback that, due to the relatively large and somewhat circular lower opening cross sectin of the holder, it is difficult to introduce the same into a filter bag known as flat bag.

It is, therefore, an object of the present invention to provide a holder of the above mentioned general type which can easily and safely be handled and which will permit the fastening of a flat filter bag on the holder in a simple manner and in a minimum of time requiring no particular skill.

This object and other objects and advantages of the invention will appear more clearly from the following specification in connection with the accompanying drawings, in which.

Figure 1:
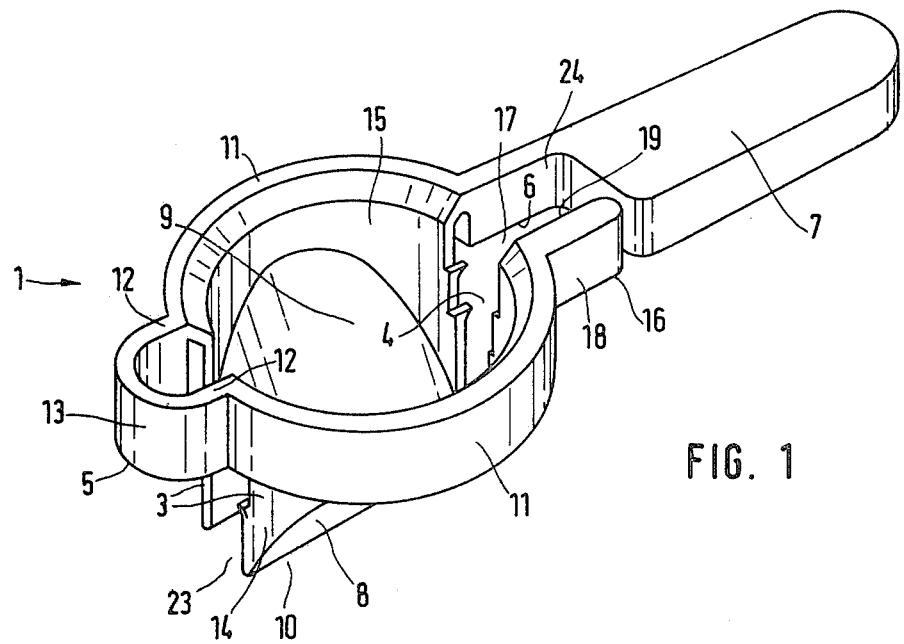
FIG. 1 is an isometric top view of a holder according to the present invention.

The holder according to the present invention is characterized primarily in that the stud at its lower end and on both sides of the slot ends in two surfaces which are located opposite to each other and which are inclined to the longitudinal axis of the stud in such a way that a wedge-shaped end region of the stud is formed which facilitates the introduction of the stud into a filter bag.

A holder according to the present invention has the advantage that it can easily be introduced into a filter bag which is designed as a flat bag. To this end it is merely necessary to press the two handle sections together to thereby reduce the diameter of the stud or its circumference, whereupon the wedge-like or cutting edge-like end region of the stud can be slipped between the two sides of the filter bag which lie one upon the other while gradually widening the opening of the filter bag. The narrow throughflow cross section formed by the wedge-like or cutting-edge-like end region of the stud brings about a certain control of the water flow when pouring the water into the stud. This helps to prevent that the filter bag will be torn off from the holder due to too strong a flow of the water.

According to a further development of the invention, the stud ends at its upper end in a hollow annular flange. In this way a safe abutment will be formed when slipping a filter bag onto the stud or introducing the stud into a filter bag. In addition thereto, there is also obtained the possibility of placing the holder upon the rim of beverage containers having different opening diameters.

A further and improved embodiment of the invention is characterized in that the stud has a second slot located diametrically opposite the first slot of the stud, which second slot extends from the lower end of the stud to about the flange so that two stud sections are formed, and that parts of the flange serve as resilient connecting piece for the two stud sections. In this way it is possible easily to adjust the spring force of the in particular one-piece holder of synthetic material in the region of the connecting piece, if this should be necessary. Furthermore, in contrast to a holder with only one slot in the stud, material is being saved in the production of the holder.

According to a still further development of the present invention, the resilient connecting piece at the same time forms an extension for placing the holder upon the rim of a beverage container. As a result thereof, the connecting piece together with that region of the handle which is adjacent to the stud is adapted beyond the flange to serve as support for the holder on the beverage container.

According to a preferred embodiment of the invention, the flange on one side of the slot ends in a handle and on the other side of the slot ends in a pressure member which extends in the direction of the handle. This pressure member confines a recess in the handle in such a way that that side of the pressure member which faces away from the handle together with the adjacent longitudinal side of the handle, which longitudinal side is adjacent to the recess, is located approximately in one plane. That side of the pressure member which faces the handle is spaced from the oppositely located lateral part of the handle by about the width of the slot. This embodiment is particularly easy to handle and is safe to use.

For operating the pressure member, the thumb of the hand grasping the handle of the holder has only slightly to be pressed against the pressure member. On the other hand, the pressure member is so arranged that it cannot be actuated accidentally.

For further securing the filter bag on the stud, it is suggested that the stud or the stud sections be provided with one or more barb-like protrusions which, when pressing the pressure member inwardly, will penetrate into the filter bag at the opening area thereof.

Figure 2:
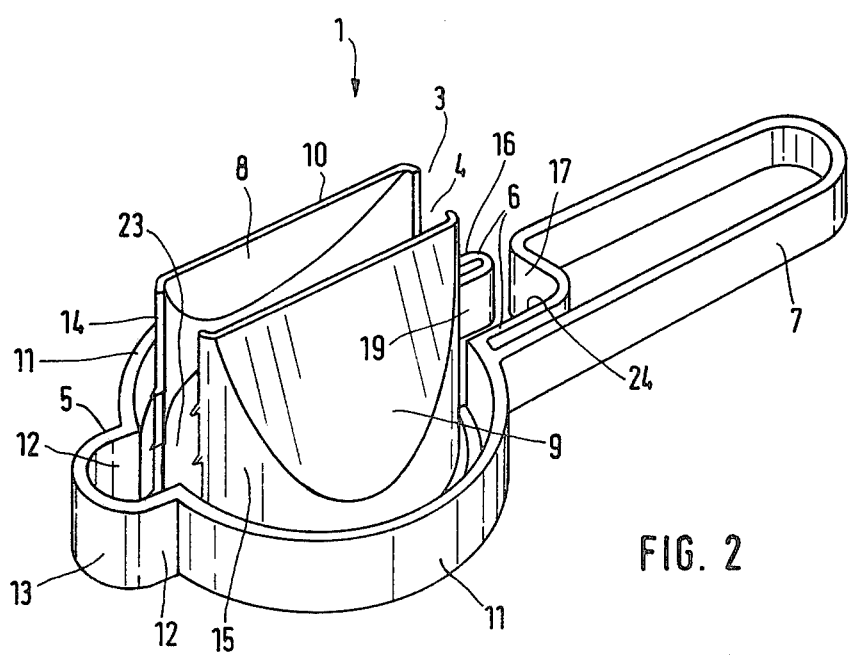
FIG. 2 shows the holder of FIG. 1 as seen from below.
Figure 3:
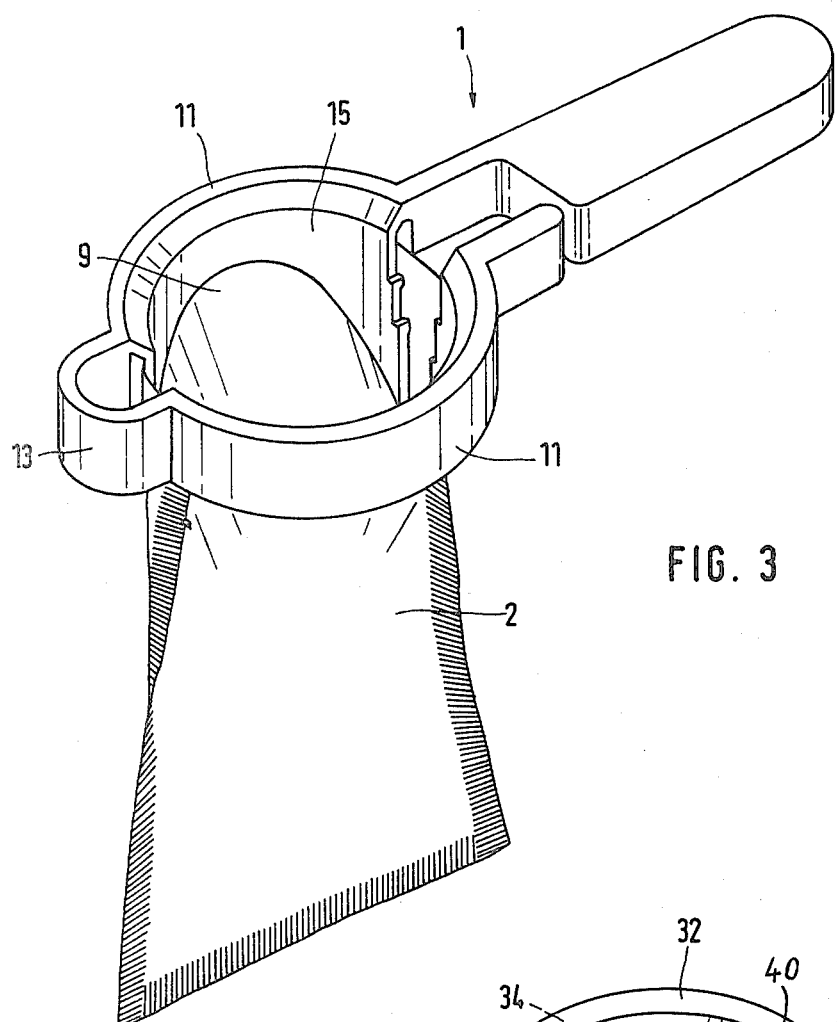
FIG. 3 shows an isometric top view of the holder of FIGS. 1 and 2.

According to still another embodiment of the invention, the flange forms a ring closed in itself while the handle of the embodiment of FIGS. 1, 2 and 3 has been replaced by ears forming part of a slotted collar connected to the closed ring. These ears are located diametrically opposite to each other. When with this holder the filter bag is introduced, the stud will upon actuation of the ears change its respective cross section unevenly and, more specifically, at an increasing rate from the upper to the lower end of stud.

Referring now to the drawings in detail and FIGS. 1 to 3 thereof in particular, these figures show a holder 1 for holding a filter bag 2, especially a filter bag designed as a flat bag. The holder 1 primarily comprises a stud 3 with a slot 4 and a handle 7 on one side of the slot 4 and furthermore comprises a pressure member 16 on the other side of the slot 4. In addition to being provided with the slot 4, the stud 3 is also provided with a diametrically oppositely located slot 23 so that the stud 3 is subdivided into stud sections 14 and 15. The stud sections 14 and 5 are through a resilient connecting member 13 connected to each other. Parts of the handle 7, of the pressure member 16 and of the connecting member 13 form supports 5 and 6 for resting the holder on the opening rim of a vessel intended for receiving the beverage. The connecting member 13 forms a resilient semicircular section 12. Furthermore, that portion of flange 11 which is located opposite to the connecting member 13 forms the pressure member 16.

The stud 3 is approximately cylindrical and slightly conical. The lower end of the stud 3 is on one and/or the other side of slot 4 provided with oppositely located surfaces 8 and 9. The surfaces 8 and 9 are inclined with regard to the longitudinal axis of stud 3 in such a way that a wedge-like or cutting edge-like end region of the stud is formed which facilitates the introduction of the stud 3 into a filter bag. By actuating the pressure member 16, which means by moving the pressure member 16 toward the handle 7, the lower opening cross section which is already relatively narrow will be reduced further so that the stud in this condition can easily be introduced into a filter bag without requiring any particular skill. After releasing the pressure member 16, the resilient connecting member 13 relaxes while increasing the opening cross section of the stud 3 so that the filter bag 2 placed upon the stud 3 will now be tightly held and expanded around the stud 3 and will be firmly grasped by the holder 1.

The hollow annular flange provides a safe limitation or abutment for the filter bag placed upon the stud 3 or the holder 1.

The pressure member 16 of holder 1 is located within a recess 17 provided in the handle 7. That side 18 of the pressure member 16 which faces away from the handle 7 is in substantial alignment with that longitudinal side of the handle 7 which is adjacent to the recess 17 or is located in one plane with this longitudinal side. That side 19 of the pressure member 16 which faces the handle 7 is spaced from the oppositely located lateral part 24 of the handle 7 by a distance approximately equalling the width of the slot 4 or the slots 4 and 23 in the stud 3.

The stud 3 has its sections 14 and 15 provided with barb-like protusions for piercing the filter bag 2 in the opening or mouth region.

Figure 4:
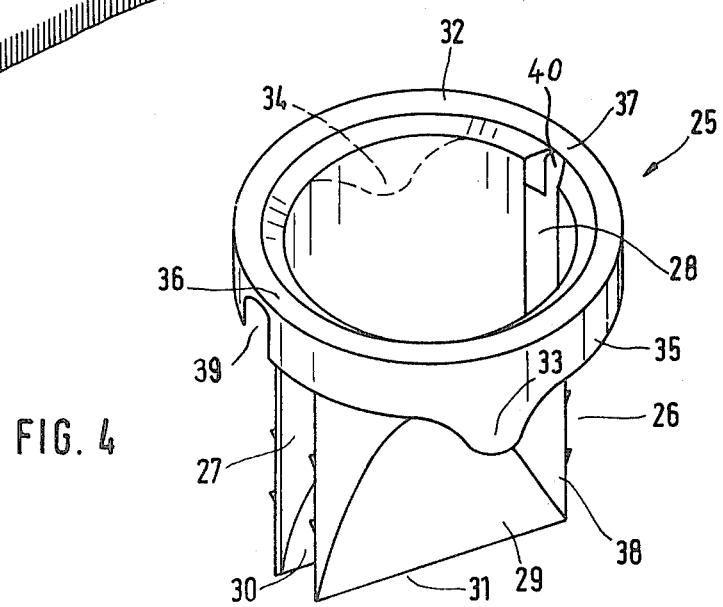
FIG. 4 shows a modificatin of the holder of FIGS. 1 to 3.

FIG. 4 shows a modification of a holder 25 which differs from the embodiment of FIGS. 1-3 primarily in that it does not have a handle and spring sections similar to handle 7 and spring section 13 of FIG. 1. Instead, the upper section of the stud 26 is provided with a ring-shaped section 32 which has a collar 35. The collar 35 is provided with cutouts 39 and 40 and has ears 33 and 34. The cylinder-shaped and/or slightly conical stud 26 has, similar to the holder 1 of FIGS. 1 to 3, its lower end provided with oppositely located surfaces 29 and 30 which form a wedge-like or cutting edge-like region 31. The stud 26 has slots 27 and 28, and the holder 25 has areas 36 and 37 on the ring-shaped section 32 which serve as resilient connecting members for the stud sections 38 formed by the slots 27 and 28. By pressing the ears 33 and 34 toward each other, which ears act as pressure members, the opening cross section in the lower region of the stud can be reduced further so that the stud 26 of holder 25 can easily be introduced into the filter bag produced as flat bag.

It is, of course, to be understood that the present invention is by no means limited to the particular showing in the drawings, but also encompasses any modifications within the scope of the appended claims.

Thus it is for instance possible to produce the stud with the wedge-like or cutting edge-like end region not out of the full, but the stud may also be made of correspondingly extending struts. Furthermore, it may be advantageous not to make the end region of the stud rectilinear, but to make the end region slightly rounded.

What I claim is:

1. A holder of elastic material for filter bags open at one end for preparing beverages, especially tea and coffee, which includes: a tubular stud for receiving and holding a filter bag, said stud having an upper part with radially outwardly extending means for resting on the opening rim of a vessel intended to receive the beverage and for limiting the slipping-on movement of the filter bag onto said stud, said tubular stud also having a lower part connected to said upper part and provided with an axial slot therethrough dividing said lower part into two sections, the lower end of said two sections respectively comprising two end surfaces inclined relative to the longitudinal axis of said stud so as to define with each other a wedge-shaped end region facilitating the slipping of a filter bag onto said stud, and resilient actuating means operable selectively to move said two sections toward each other against the resilient force thereof to facilitate the slipping of a filter bag onto said stud and subsequently to allow the resilient force of said resilient actuating means to spread said sections apart so as to cause said sections to hold a slipped-on filter bag on said stud.

2. A holder according to claim 1, in which said upper part includes an annular flange.

3. A holder according to claim 2, in which said slot has two diametrically oppositely located slot sections extending through the axial length of said lower stud section, portions of said flange serving as resilient connecting member for said stud sections continuously urging the latter apart.

4. A holder according to claim 3, in which said resilient connecting member forms an extension of said upper part for supporting said holder on a beverage receiving container.

5. A holder according to claim 2, in which said flange on one side of said slot has connected thereto a handle provided with a recess adjacent said flange and in which on the other side of said slot adjacent to and opposite a portion of said handle said flange has connected thereto a pressure member at least partially located and movable in said recess, said pressure member having that side thereof which extends in the longitudinal direction of said handle and faces into said recess spaced from the opposite handle wall portion by about the width of said slot.

6. A holder according to claim 5, in which the lateral outer side of said pressure member and the adjacent lateral outer side of said handle are located in about the same plane.

7. A holder according to claim 1, in which said stud is provided with barb-shaped projections for piercing an inserted filter bag.

8. A holder according to claim 1, in which said upper part includes an annular strip of resilient material closed in itself and also includes a collar with two diametrically oppositely located slots and two oppositely located ears forming pressure members operable to selectively press said stud sections toward each other, said ears respectively being located between said slots.

* * * * *